United States Patent [19]

Hans et al.

[11] Patent Number: 5,343,129

[45] Date of Patent: Aug. 30, 1994

[54] DRIVE CIRCUIT FOR A BRUSHLESS DIRECT-CURRENT MOTOR

[75] Inventors: Helmut Hans, St. Georgen; Mojtaba Moini, Könisgfeld, both of Fed. Rep. of Germany

[73] Assignee: Papst Licensing GmbH, Spaichingen, Fed. Rep. of Germany

[21] Appl. No.: 76,720

[22] Filed: Jun. 14, 1993

Related U.S. Application Data

[63] Continuation of Ser. No. 932,737, Aug. 25, 1992, Pat. No. 5,220,258.

[30] Foreign Application Priority Data

Jun. 18, 1990 [DE] Fed. Rep. of Germany ....... 4019338

[51] Int. Cl.⁵ .............................................. H02P 1/18
[52] U.S. Cl. .................................................. 318/431
[58] Field of Search ............... 318/430, 431, 254, 439, 318/138

[56] References Cited

U.S. PATENT DOCUMENTS

| | | |
|---|---|---|
| 3,801,887 | 4/1974 | Allard . |
| 4,052,650 | 10/1977 | Gramkow . |
| 4,263,535 | 4/1981 | Jones . |
| 4,481,449 | 11/1984 | Rodal . |
| 4,507,591 | 3/1985 | Kelleher . |
| 4,510,422 | 4/1985 | Ogura . |
| 4,583,028 | 4/1986 | Angersbach et al. . |
| 4,591,768 | 5/1986 | Kudelski ........................ 318/599 X |
| 4,656,553 | 4/1987 | Brown . |
| 4,760,317 | 7/1988 | Hetzel et al. . |
| 4,804,892 | 2/1989 | Mueller . |
| 4,814,674 | 3/1989 | Hrassky . |
| 4,827,196 | 5/1989 | Odell . |
| 4,856,078 | 8/1989 | Konopka ........................ 318/599 X |
| 4,924,156 | 5/1990 | Mueller . |
| 5,038,083 | 8/1991 | Mueller . |

FOREIGN PATENT DOCUMENTS

| | | |
|---|---|---|
| 0318938 | 6/1989 | European Pat. Off. . |
| 3044027A1 | 8/1981 | Fed. Rep. of Germany . |
| WO87/02528 | 4/1987 | Fed. Rep. of Germany . |

OTHER PUBLICATIONS

M. Yamamoto et al., "High Voltage DC Brushless Motor Driven in PWM Mode" National Technical Report, vol. 37, No. 2, Apr. 1991.

The published data sheet of Harris Corporation for the HV-2405E Single Chip Power Supply, consisting of 12 pates and published Feb. 1990.

*Primary Examiner*—Bentsu Ro
*Attorney, Agent, or Firm*—Finnegan, Henderson, Farabow, Garrett & Dunner

[57] ABSTRACT

A drive circuit for a brushless direct-current motor, particularly a fan motor, which permits a flexible control or regulation of the power delivered to the direct-current motor depending on a desired or reference value. The drive circuit consists of power output stages which are supplied via a rectifier circuit direct from the a.c. supply, while the control of the power output stages is effected by a special control circuit. This control circuit is supplied via an auxiliary supply part from the a.c. supply. The control circuit delivers ramp-shaped output pluses each driving a control pulse for the motor current which comprises within each commutation phase a pulse that can vary from a symmetrical triangular form to a trapezoidal form. The driving circuit includes a restart circuit which supplies a separate supply voltage to an intermediate drive stage in a fashion which becomes intermittent if the motor is overloaded or blocked.

1 Claim, 3 Drawing Sheets

DRIVE CIRCUIT FOR A BRUSHLESS DIRECT-CURRENT MOTOR

CROSS-REFERENCE TO RELATED APPLICATION

This application is a continuation of application Ser. No. 07/932,737 filed Aug. 25, 1992, now U.S. Pat. No. 5,220,258 issued on Jun. 15, 1993.

BACKGROUND OF THE INVENTION

1. Field of the Invention

The invention relates to a driving circuit for a brushless direct-current motor, particularly a fan motor, with a rotor position transmitter, and a control circuit which, depending upon the output signals of the rotor position transmitter determines the commutation phases and within the latter prepares output signals for the individual motor windings, the amplitude and/or duration of which are controlled or regulated depending upon a desired value or a guiding value, as well as a supply part to supply the control circuit including the rotor position transmitter with direct current from an alternating current supply.

2. Discussion of the Related Art

Already known from PCT Publication No. WO 87/02528 is a control circuit for brushless direct-current motors which, in the form of an integrated circuit, contains all the circuitry for the direct control of the motor windings, and is presented with a minimum of external constructional elements, namely a Hall-effect sensor as a rotor position transmitter and a single capacitor as a time function element in a pulse wave shape generator of the control circuit.

With this known control circuit it is possible to control or to regulate the power supplied to the direct-current motor depending on a desired value or a guiding value, so that it can be adapted to requirements. For example, it is possible, when using the brushless direct-current motor as a fan motor, to control the cooling performance of the fan depending upon the heat development of an electronic apparatus, i.e., when heat development is low the fan rotates slowly and produces little noise, whereas, for a higher development of heat, the fan runs faster and supplies a greater amount of cold air. This known control circuit with end steps is supplied by means of a low operational direct-current voltage of, e.g., 12 V., which, normally, is taken from the anyway available supply part of the electronic apparatus.

However, there are limits to the performance of such a brushless direct-current motor including control circuit and end steps, which limits are determined in particular by the maximum permissible loss performance in an integrated circuit. In addition, the amount of direct current which can be supplied from the supply part of an available electronic apparatus is also limited. Accordingly, normally, the larger fans are supplied direct from the alternating current supply so as not to overload the supply part of the electronic apparatus. Such a fan is then, however, not regulable normally in terms of its performance, so that, also in the case of necessary cold performance, the fan continues to rotate on full power with relatively high noise.

SUMMARY OF THE INVENTION

It is the object of the present invention to propose a drive circuit for a brushless direct-current motor, particularly a fan motor, which retains the advantages of flexible regulation or control of the direct-current motor by a corresponding control circuit, and by means of which brushless direct-current motors of relatively high power can be flexibly controlled or regulated without great expenditure on circuitry.

This object is achieved by means of a drive circuit of the type first defined hereinabove in that provision is made for additional power output stages for the motor windings which are controlled by the control circuit and are supplied via a rectifying circuit directly from the a.c. supply, and in that the control circuit including rotor position transmitter and possibly intermediate drive stages are supplied with a lower operational voltage via an auxiliary supply part from the a.c. supply.

Such a drive circuit has the substantial advantage that it is possible to bring into use an already available control circuit for lower powers for the flexible control or regulation of the direct-current motor, and it is possible to achieve an increase of power through the corresponding additional power output stages with only a few constructional elements. The necessary auxiliary supply part need only have relatively low power, as the output stages of the available control circuit can be operated with only relatively low output current.

An advantageous embodiment of the invention is characterized in that the control circuit supplies ramp output pulses, there lying within each commutation phase a pulse which, on lower output powers, has the form of symmetrical triangular pulses of variable amplitude and, on further rising, go over into the shape of trapezoidal pulses of variable width. As a result of the use of such a control circuit for controlling the performance end steps, the great advantage is gained that the entire drive circuit operates at low power in analogue operation with relatively flat rise and fall flanks of the output pulses, so that the direct-current motor when operating produces only slight noises. On an increase of the output power, on the other hand, the drive circuit operates in analogue/switch operation with trapezoidal output pulses in a better degree of efficiency, so that the looses in the performance end steps do not rise too sharply. The rather higher noises of the motor occurring in this instance hardly disturb in the case of a fan operation, as the noise of the fan also rises. The triangular or trapezoidal pulses of the drive circuit lie preferably symmetrically within the commutation phases of the motor, to achieve the highest possible efficiency.

The auxiliary circuit part is preferably constructed as an integrated circuit which by means of a clocked switch and a load capacitor derives a filtered and regulated direct voltage from the a.c. supply. Such a switch has the advantage that it is presented without a supply transformer and, nevertheless, has a relatively high level of efficiency.

Further advantageous constructions of the invention will be found in the dependent claims.

BRIEF DESCRIPTION OF THE DRAWINGS

The invention will be described in greater detail below on the basis of an example of embodiment with reference to the attached drawings wherein.

DETAILED DESCRIPTION

Figure 1:
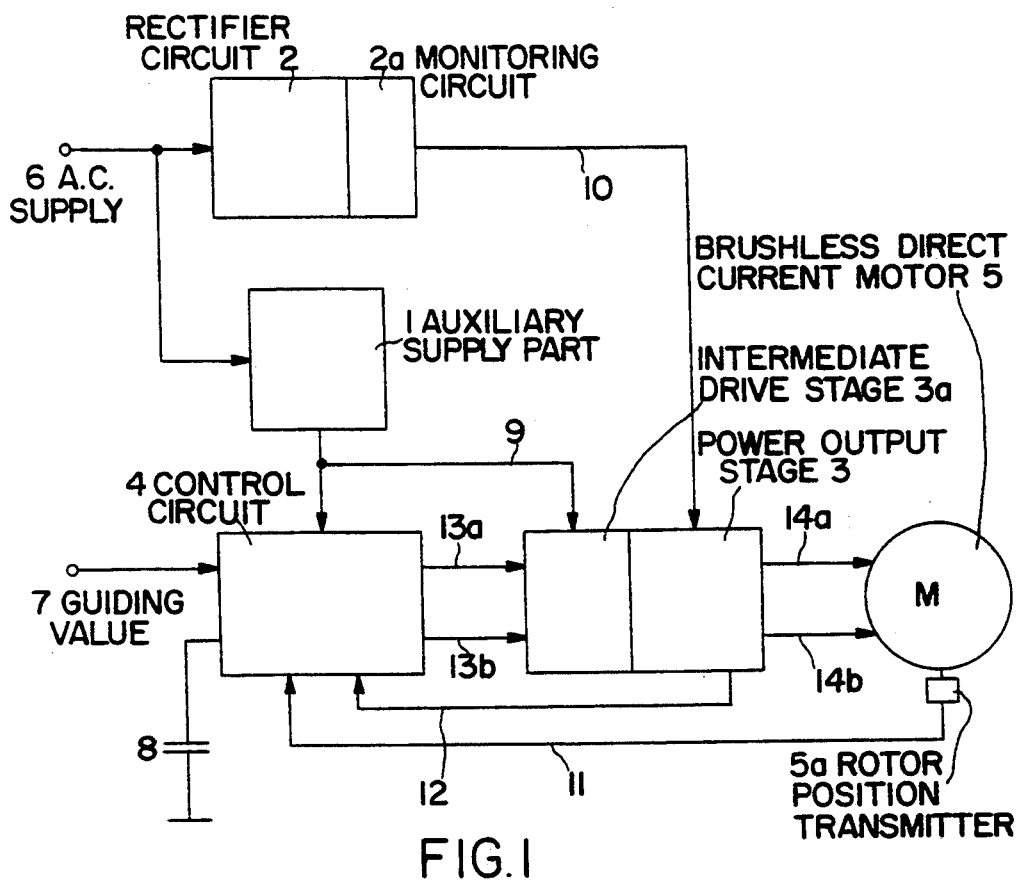
FIG. 1 is a block diagram of the drive circuit of the invention.

Connected to an a.c. supply 6 of e.g. 220 V is a rectifier circuit 2 which produces from this a.c. voltage without the use of a transformer an output direct-current voltage 10 of e.g. 200–300 V. This output direct-current voltage 10 is supplied to a power output stage 3 which, directly through output leads 14a and 14b, supplies a brushless direct-current motor 5.

The control of the power output stages 3 is effected by means of a control circuit 4 via output leads 13a and 13b. This control circuit 4, including a downstream intermediate drive stage 3a is supplied by means of an auxiliary supply part 1 from the a.c. supply 6. The auxiliary supply part 1 produces at its output 9 a low output direct voltage of, e.g., 12 V for which the control circuit 4 and the intermediate drive stage 3a have been set out. The power to be brought up from the auxiliary supply part 1 is relatively small, as the power for the drive of the brushless direct-current motor 5 is supplied by the rectifier circuit 2 direct from the supply 6.

Downstream of the rectifier circuit 2 there is furthermore a monitoring circuit 2a which provides in known manner for switch-on current limitation and excess current limitation.

Now that a description has been given of the supply of current to the individual units for the drive circuit by means of a rectifier circuit 2 connected direct to the supply 6 and by means of an additional auxiliary supply part 1, a further description is given of the function of the drive circuit in association with the special control circuit 4.

The control circuit 4 is designed in the form of an integrated circuit such as described, for example, in the PCT Publication WO 87/02528 already referred to. This control circuit contains all the constructional units for the drive of the motor windings of a brushless direct-current motor of smaller power along output leads 13a and 13b, which are connected to internal output stages of the control circuit 4. A rotor position transmitter 5a of the motor 5, designed preferably as a Hall-effect sensor of the integrated circuit type, supplies along the lead 11 rectangular pulses 11a, 11b, as shown in FIG. 2. In this arrangement, pulse 11a determines the commutation phase for one of the motor windings, while the pulse pause 11b defines the commutation phase for the other motor winding. In addition, in known manner, from the motor windings, voltages are coupled out which are proportional to the rpm of the motor 5. These pass along a lead 12 into the control circuit 4. From the output signals 11 of the rotor position transmitter 5a the direct-current voltage 10 of FIG. 1 as a delta voltage (cf. 20 of FIG. 2) is derived, the pulses of which are symmetrical to the commutation phases 11a or 11b of the rotor position transmitter 5a. The width of the triangular pulses corresponds—independently of the rpm of the motor 5—substantially to the width of the commutation phase 11a or 11b, and indeed this, in evaluation of the voltage 12 proportional to the rpm of the motor 5 and in connection with an external capacitor 8 as a timing element is arrived at. Details of this circuit will be found in the already mentioned PCT Publication WO 87/02528.

Supplied to the control circuit 4 is a desired value 7 or a guiding value which determines a threshold value 21a or 21b. If the desired value 7 is small, then there is, for example, a threshold value at the level of the dashed line 21a. The control circuit 4 effects that the part of the delta voltage 20 which exceeds this threshold is issued from the respective output stage of the control circuit 4 as output signal 13a or 13b, as shown by FIG. 2 for the two output leads 13a or 13b.

The triangular pulses 22a and 22b belong to the threshold value 21a. If the desired value 7 is raised, the threshold value is lowered in the direction of the lower value 21b. The part of the delta voltage 20 exceeding this threshold value is now greater as will be seen from the pulse trains 13a or 13b of FIG. 2. There arise here per se triangular pulses 23a or 23b of higher amplitude. The peaks of these triangular pulses, however, do not become effective as the output stages within the control circuit 4 or the power output stages 3 are already situated in saturation. Out of the triangular pulses of higher amplitude there come, thus, trapezoidal pulses 23a and 24b. In FIG. 2, by means of the dashed line 24, this threshold has been drawn in, from which the output stage transistors go over into saturation state.

The control circuit 4 thus effects that at its output leads 13a and 13b in the respective commutation phase 11a or 11b triangular pulses 22a or 22b of variable amplitude 22a or 22b are produced, these pulses going over to the trapezoidal form 23a or 23b at the higher values. It will be recognized that both the triangular pulses 22a and 22b and the trapezoidal pulses 23a and 23b lie symmetrically within the commutation phases 11a and 11b, so that an optimum efficiency level is arrived at for the direct-current motor 15.

The control circuit 4 may possibly contain also a regulation circuit in order to regulate the output signals 13a, 13b or 14a, 14b dependent upon the desired value 7 and a fed-back rotational speed voltage 12.

The output states in the control circuit are normally suitable for the direct operation of a direct-current motor of low power. In order to control the power windings with higher power via the power output stages 3 directly proportionally to the output signals 13a or 13b, intermediate drive stages 3a are provided between the control circuit 4 and the power output stages 3, which effect the corresponding signal adaption and, in addition, ensure that the output current in the leads 14a and 14b is directly proportional to the output signals 13a and 13b of the control circuit 4.

Figure 2:
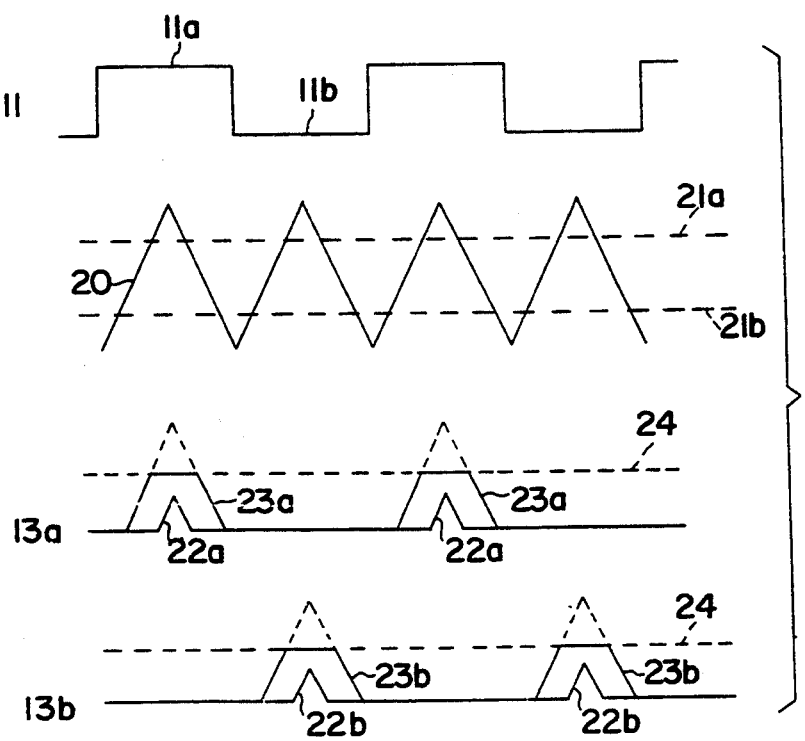
FIG. 2 is a pulse diagram for the various pulse trains of the drive circuit of FIG. 1.
Figure 3:
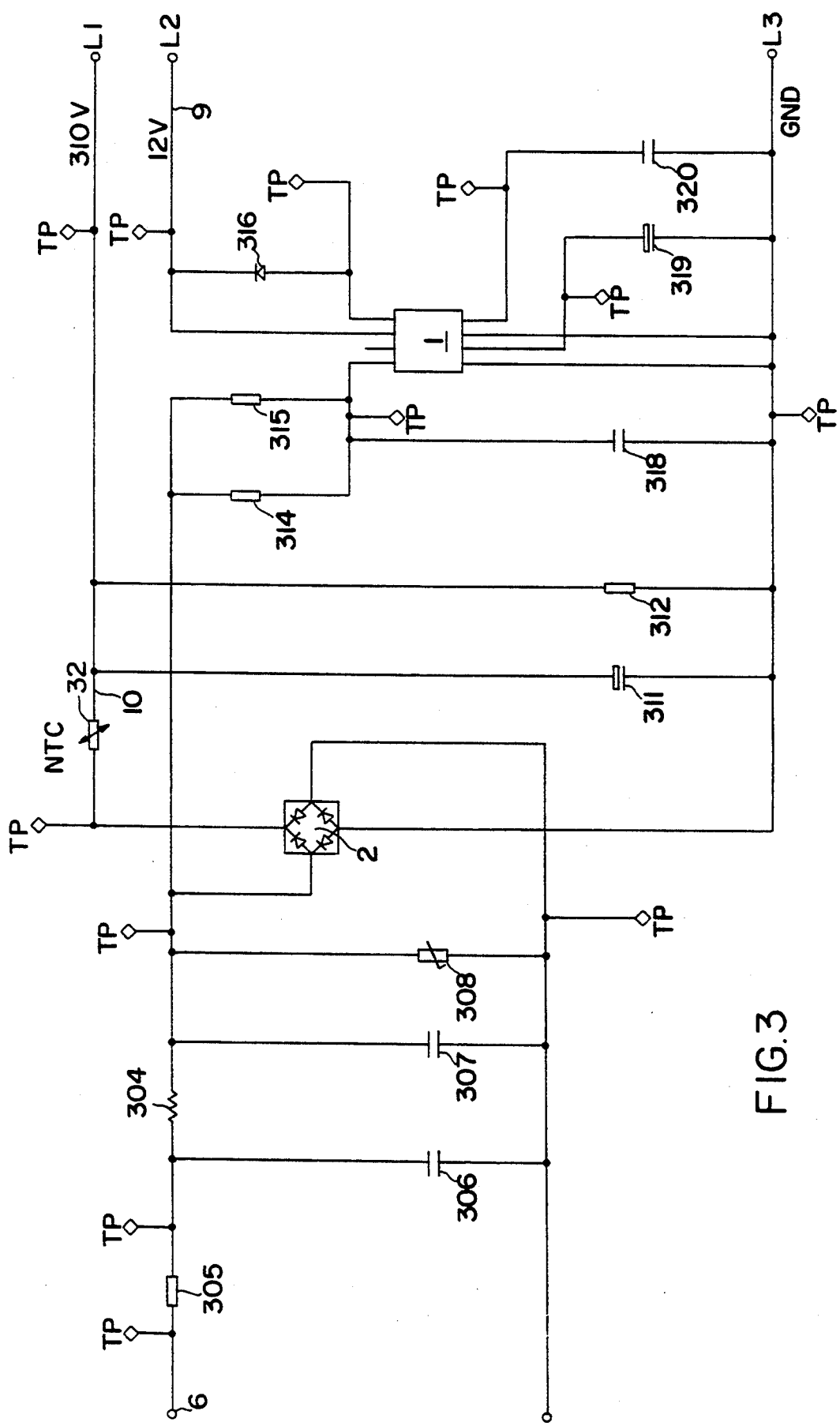
FIG. 3 is a schematic illustration of a preferred implementation of the power supply of FIG. 1.
Figure 4:
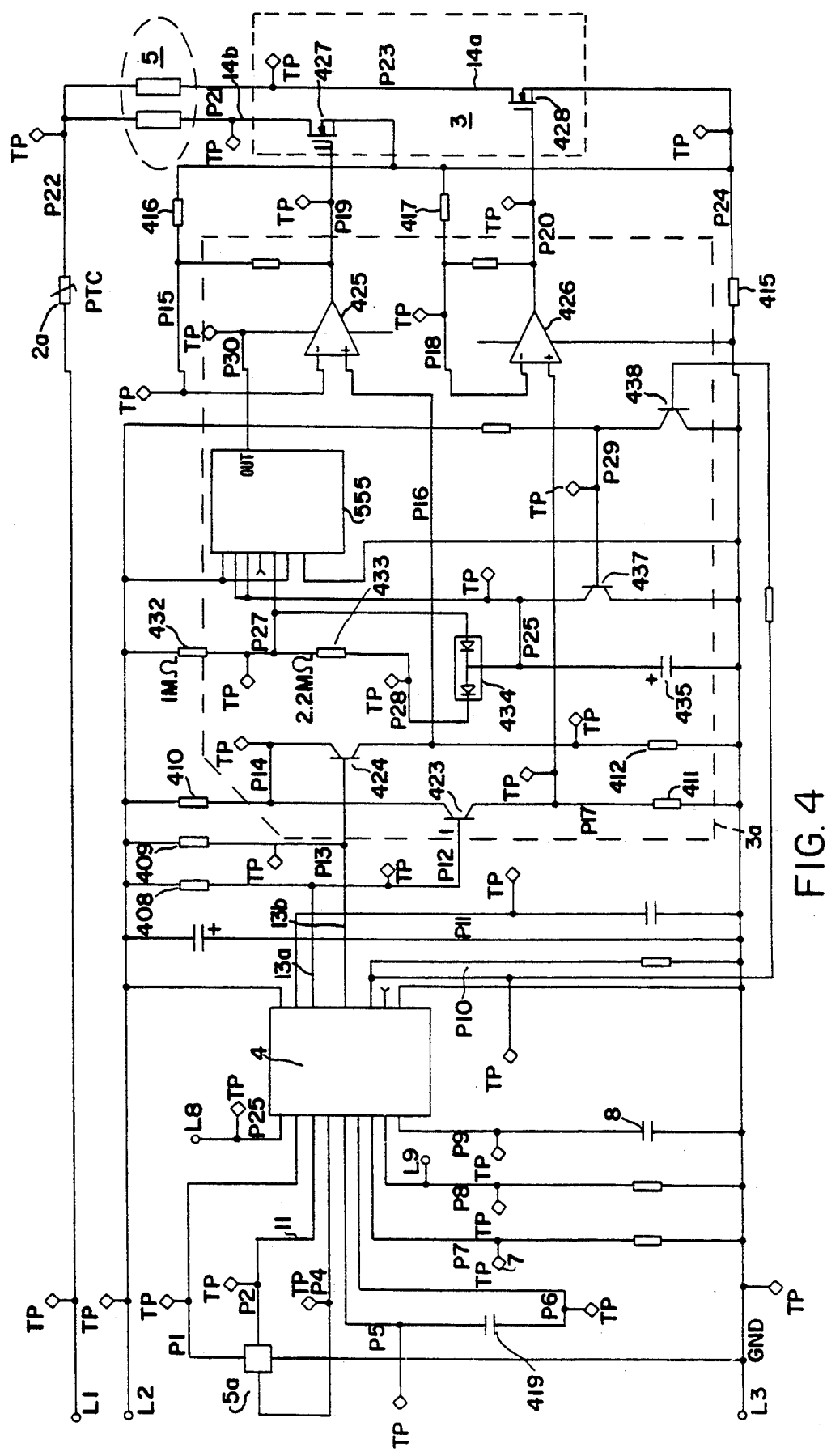
FIG. 4 is a schematic illustration of a preferred implementation of the remainder of the circuitry of FIG. 1.

The associated FIGS. 3 and 4 represent the best embodiment and indicate additional details compared with FIG. 1. FIG. 3 illustrates a power supply unit, whilst in FIG. 4 the closed-loop speed control stages and the power output stages are shown, as well as intermediate driver stages and a monitoring circuit.

In FIG. 3, the output terminals L1 for 310 volts DC and L2 for 12 volts DC are shown next to the input terminals for the AC network 6, whilst L3 illustrates the ground terminal. In addition, there are a number of test points TP, such as are useful for checking the circuit. The system voltage is initially protected from short-circuits by means of a fuse element 305. An LC unit consisting of the inductance 304 and the capacitors 306, 307 ensures, while interacting with a varistor 308, the limiting of overvoltage pulses and the suppression of electromagnetic compatibility faults. The system alternating-current voltage is then rectified with the rectifier circuit 2 and fed via a series resistor 32 (NTC resistor) to the line 10 or L1. The associated ground line is marked with the letters GND and leads to the output terminal L3. The DC output voltage on the line 10 is smoothed by the capacitor 311, in parallel with which a discharge resistor 312 is connected. The system voltage which can be tapped off at the resistor 304 is additionally connected via series resistors 314, 315 to the input of the auxiliary circuit part 1. From here, a further capacitor 318 is connected to ground potential. The auxiliary circuit part is also connected directly to ground potential by one or more lines. The smoothing capacitors 319 and 320 also connect the auxiliary circuit part 1 to ground potential. The auxiliary circuit part generates a voltage of approximately 12 volts on the output line 9. The latter voltage is monitored by means of a Zener diode 316. In FIG. 4, the high DC supply voltage is fed via connection point L1 across the monitoring circuit 2a (here in the form of a PTC resistor) to the stator coils of the DC motor 5. The latter are connected by means of the line 14a or 14b to the associated field-effect transistors 428 and 427 of the output stage 3. The drive signals for the transistors 427 and 428 are derived as mentioned above from the output signals of the rotor position transmitter 5a which draws its supply voltage from the control circuit 4 and also returns its useful signals to the said control circuit 4 via the line 11. The triangular voltage is available at the capacitor 419, whilst the rotational speed actual value can be tapped off at the capacitor 8. The output signals of the control circuit 4 are fed via line 13a and 13b to the bases of the transistors 423 and 424, the bases being provided with a positive bias voltage via the resistors 408 and 409. The transistors 423, 424 are pnp-type transistors, the emitters of which are connected via a common series resistor 410 to the low supply voltage of approximately 12 volts. Both transistors are connected to ground with, in each case, a collector resistor of approximately 3 kiloohms. The signal which can be tapped off at the collectors is fed in each case directly to the non-inverting inputs of the current controlling stages 425 and 426. The latter consist of operational amplifiers, the output signal of which is on the one hand conducted directly to the gates of the output stage transistors 427 and 428 and, on the other hand, is fed back via feed-back resistors of approximately 33 kiloohms to the inverting input in each case. Furthermore, the inverting inputs sense, in each via a series resistor 416, 417 of approximately 3 kiloohms in each case, a voltage at the current measuring resistor 415 which is proportional to the motor current. In this way, it is ensured that the output transistors 427 and 428 are made conductive as a function of the output signal on lines 13a and 13b. The operational amplifiers of the current controlling stages 425 and 426 receive their supply voltage via the output of a restarting circuit 555 which ensures a reliable restarting of the motor in the case of a lasting overloading or blocking of the motor 5. For this purpose, it is provided that in such a case of overloading the current controlling stages 425 and 426 receive supply voltage for approximately one second, whereupon their supply voltage is switched off again for approximately four seconds. This enables the monitoring circuit 2a (PTC resistor) to cool down sufficiently and to make a nominal starting current available. The mode of operation of the restarting circuit is based on the fact that the control circuit 4 feeds to the base of the transistor 438 a trigger signal which is proportional to the rotational speed (two pulses per revolution of the motor), which signal, after further inversion by means of the transistor 437, brings about a situation where the capacitor 435 cannot be charged in any appreciable way via the series resistor 432 and the right arm of the double diode 434. If these trigger pulses do not occur, the capacitor 435 becomes charged so that the collector of the transistor 437 is at a raised potential after a few seconds and causes the restarting circuit 555 to oscillate by means of the trigger input of said restarting circuit. This is brought about in that a discharge output of the restarting circuit 555 can discharge the capacitor 435 via discharge resistor 433 and the left arm of the double diode 434. Since the resistor 433 has a higher impedance than the charging resistor 432, the discharging takes approximately four times as long as the charging of the capacitor 435. The current controlling stages 425 and 426 are thus provided with supply voltage in an approximately 5 second rhythm for approximately one second in each case, and specifically until, after the motor 5 restarts, the control circuit 4 feeds trigger pulses to the base of the transistor 438 again, so that the capacitor 435 can be kept continuously discharged.

Of course, the restarting circuit described can also be operated with other devices which are protected by a PCT resistor and which normally make available a minimum number of pulses per time unit, such as for example switched mode power supplies.

We claim:

1. A restart circuit that is supplied with trigger pulses of a predetermined minimal rate, the output signal of which is one predetermined voltage level in case the trigger pulses have a sufficient rate or frequency and is of another predetermined voltage level in case the trigger pulses have less than a predetermined frequency, the restart circuit comprising a timing integrated circuit (555), a charging resistor (432), a discharging resistor (433) a capacitor (435), decoupling diodes (434), discharging means (437) and amplifying means (438).

* * * * *

UNITED STATES PATENT AND TRADEMARK OFFICE
CERTIFICATE OF CORRECTION

PATENT NO. : 5,343,129
DATED : August 30, 1994
INVENTOR(S) : Helmut HANS et al.

It is certified that error appears in the above-indentified patent and that said Letters Patent is hereby corrected as shown below:

Claim 1:

Column 6, line 45, before "one" insert —of—; and
line 51, after "(433)" insert —,—.

Title Page:
In the Abstract: Item [57]

Line 11, "pluses" should read —pulses—.

Related U.S. Application Data: Item [63]

Line 2, after "5,220,258" insert —, which is a continuation of Serial No. 717,142, filed on June 18, 1991, now abandoned—.

Column 1, line 9, after "1993" insert —, which is a continuation of Serial No. 07/717,142, filed on June 18, 1991, now abandoned—.

Signed and Sealed this

Fourteenth Day of November, 1995

Attest:

BRUCE LEHMAN

*Attesting Officer*   Commissioner of Patents and Trademarks